United States Patent [19]

Obrist et al.

[11] Patent Number: 4,508,690
[45] Date of Patent: Apr. 2, 1985

[54] METHOD OF PRODUCING VERY PURE MAGNESIUM OXIDE

[75] Inventors: Albert Obrist, Elgg; Balkrishna B. Gadgill, Raterschen, both of Switzerland

[73] Assignee: Sulzer Brothers Limited, Winterthur, Switzerland

[21] Appl. No.: 527,354

[22] Filed: Aug. 29, 1983

Related U.S. Application Data

[63] Continuation of Ser. No. 154,821, May 30, 1980, abandoned.

[30] Foreign Application Priority Data

Jun. 20, 1979 [CH] Switzerland ............... 5745/79

[51] Int. Cl.³ ............................................ C01F 11/04
[52] U.S. Cl. ..................................... 423/173; 423/165; 423/175; 423/431; 423/470; 423/497; 423/637
[58] Field of Search ............... 423/431, 165, 175, 177, 423/637, 357, 173, 470, 497

[56] References Cited

U.S. PATENT DOCUMENTS 1,838,587 12/1931 Sperr ..................... 423/357
2,400,360 5/1946 MacMullin et al. ........... 423/431
2,941,860 6/1960 Annis ..................... 423/431

FOREIGN PATENT DOCUMENTS 650359 3/1964 Belgium ................... 423/637
1467287 2/1969 Fed. Rep. of Germany ...... 423/431
778120 7/1957 United Kingdom ............. 423/165

OTHER PUBLICATIONS

*Hackh's Chemical Dictionary*, Fourth Edition, McGraw Hill Book Co. (1969), p. 401.
Kirk Othmer, *Encyclopedia of Chemical Technology*, Second Edition, vol. 12, pp. 711, 712 (1967), Interscience Publishers.

*Primary Examiner*—John Doll
*Assistant Examiner*—Wayne A. Langel
*Attorney, Agent, or Firm*—Kenyon & Kenyon

[57] ABSTRACT

Very pure magnesium oxide is obtained from ore containing magnesium, more particularly ore containing magnesium carbonate, by calcining the ore and leaching the resulting magnesium oxide with carbon dioxide and calcium chloride solution to produce magnesium chloride solution. Carbon dioxide and ammonia are added, so as to precipitate magnesium carbonate trihydrate, which is decomposed to magnesium oxide.

13 Claims, 2 Drawing Figures

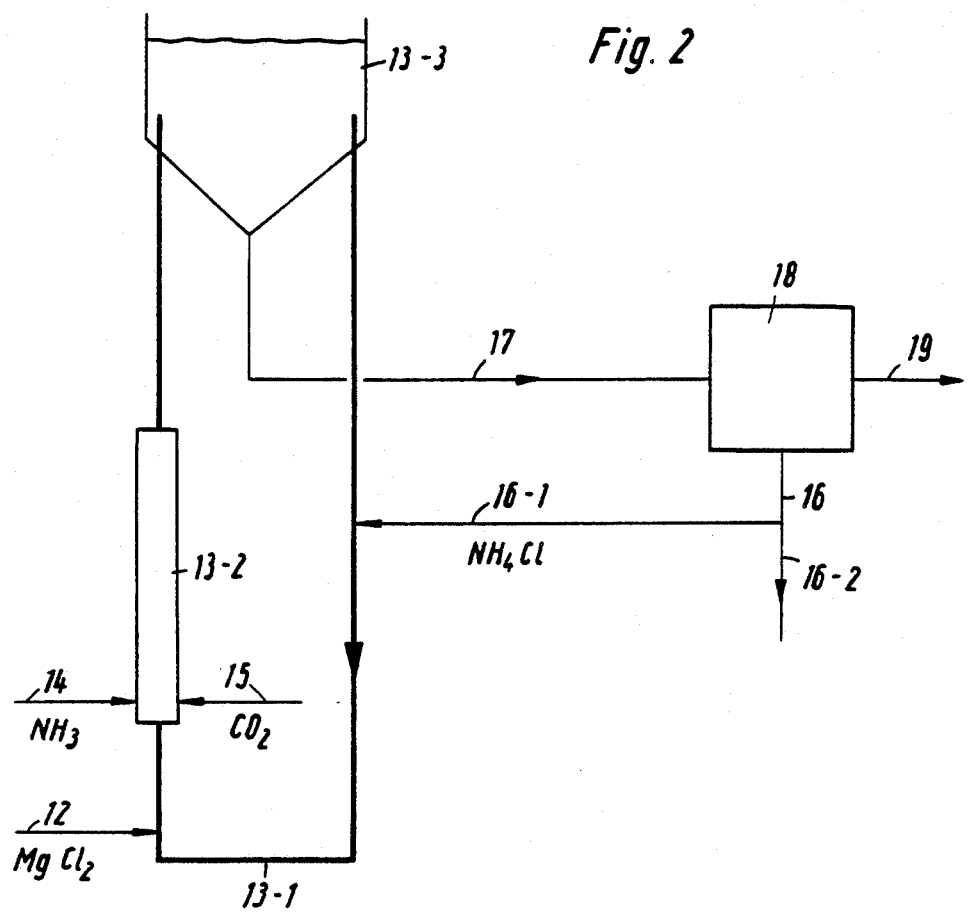

METHOD OF PRODUCING VERY PURE MAGNESIUM OXIDE

This is a continuation of application Ser. No. 154,821 filed May 30, 1980 abandoned.

This invention relates to a method of producing very pure magnesium oxide from an ore containing magnesium and particularly from an ore containing magnesium carbonate.

Heretofore, it has been known to produce magnesium oxide from magnesium-containing ores by leaching the ores with hydrochloric acid, by purifying the resulting magnesium chloride solution and by heating the solution to decompose the solution into magnesium oxide and hydrochloric acid. However, one disadvantage of this method is that a large amount of energy is required for thermal decomposition.

Accordingly, it is an object of this invention to provide a method of producing very pure magnesium oxide from a magnesium containing ore without high energy consumption.

It is another object of the invention to reduce the investment costs for obtaining pure magnesium oxide from ores containing magnesium.

It is another object of the invention to provide a process of obtaining magnesium oxide from ores which does not require a thermal decomposition of a magnesium-containing solution.

It is another object of the invention to provide a method of obtaining magnesium oxide which does not require the use of corrosive acids.

Briefly, the invention provides a method of producing pure magnesium oxide which is comprised of the steps of calcinating an ore containing magnesium, particularly a magnesium carbonate, in order to obtain magnesium oxide, of thereafter leaching the obtained magnesium oxide with carbon dioxide and a calcium chloride solution in order to obtain a magnesium chloride solution, of adding carbon dioxide and ammonia to the magnesium chloride solution to precipitate magnesium carbonate trihydrate and of thereafter decomposing the magnesium carbonate trihydrate to obtain the magnesium oxide.

The combination of leaching with carbon dioxide and calcium chloride solution and subsequent precipitation of magnesium carbonate trihydrate yields an advantageous process in which there is no need to waste energy in thermal decomposition of the magnesium-containing solution. There is also little corrosion, since no corrosive acids take part in the process.

In accordance with the invention, the magnesium chloride solution is continuously introduced in a concentration of from 15% to 25% into a circuit maintained at a temperature of from 25° C. to 45° C. and a pH of from 7.5 to 8.5. At the same time the carbon dioxide and ammonia are added continuously into the circuit in approximately stoichiometric ratios in order to precipitate the magnesium carbonate trihydrate and to obtain an ammonium chloride solution. In addition, a part of the precipitated magnesium carbonate trihydrate crystals are continuously separated from the circuit and are thereafter washed dried and calcinated to obtain the magnesium oxide. Also, the ammonium chloride solution is continuously withdrawn from the circuit.

It is known to precipitate magnesium-containing solids from magnesium-containing solutions, e.g. in the case of magnesium hydroxide, basic magnesium carbonate and magnesium carbonate trihydrate. All these methods of precipitation, however, have a disadvantage in that they must be performed in relatively highly dilute solutions and the product is often difficult to filter and wash. The invention seeks a method of working with much more concentrated solutions, with a good-quality solid. This is necessary with a view to the most economic recovery of the substances used (carbon dioxide and more particularly ammonia), which will require much greater energy if the water content is higher, because large amounts of water will have to be treated.

These and other objects and advantages of the invention will become more apparent from the following detailed description taken in conjunction with the drawings in which:

FIG. 2 illustrates a detailed view of a part of a precipitator in accordance with the invention.

Figure 1:
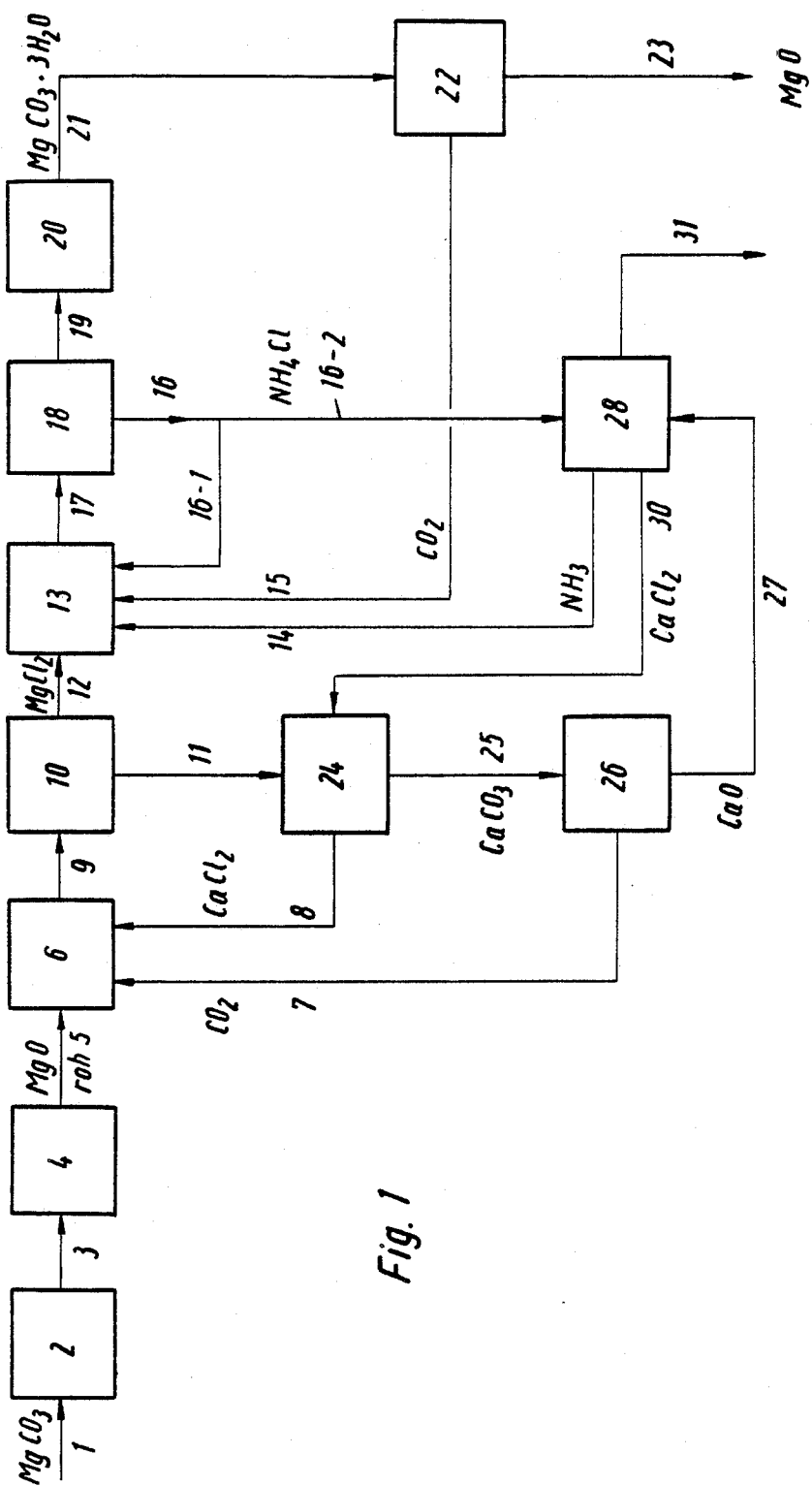
FIG. 1 illustrates a block diagram of a process according to the invention.

Referring to FIG. 1, in accordance with the method, a raw material, such as a magnesite ore ($MgCO_3$) enters via a duct or path 1 into a furnace 2. Generally, the ore contains considerable quantities of impurities such as $SiO_2$, $Fe_2O_3$ and $Al_2O_3$. The magnesite ore is then calcined in the furnace 2 at a temperature up to 800° C. in order to obtain magnesium oxide (MgO). The resulting magnesium oxide which contains the aforementioned impurities then flows along a duct or path 3 to a mill 4. This mill 4 functions to comminute the ore and delivers the comminuted ore through a line or path 5 to a leaching stage or container 6. The leaching stage 6 also receives a flow of carbon dioxide ($CO_2$) and calcium chloride solution ($CaCl_2$). The magnesium oxide slowly dissolves in the leaching stage 6 in accordance with the equation

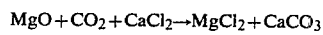

$$MgO + CO_2 + CaCl_2 \rightarrow MgCl_2 + CaCO_3$$

Advantageously, the process of dissolution is as follows:

A suspension of magnesium oxide in calcium chloride solution is first produced, after which gaseous carbon dioxide is introduced. In the process, the magnesium oxide changes into soluble magnesium chloride, and calcium carbonate ($CaCO_3$) is precipitated. The calcium chloride content of the suspension continuously decreases; ideally the calcium chloride vanishes completely. The reaction temperature is kept at approximately room temperature; the pressure is atmospheric; and the rate at which the carbon dioxide is added to the suspension is sufficient to maintain the pH at least above 5.5 to 6, since otherwise the reaction will irreversibly stop even if there is a large amount of undissolved magnesium oxide.

If necessary, the proportion of crude magnesium oxide can be subsequently adjusted. At the end of the leaching operation, very pure magnesium chloride solution is obtained. The impurities remain undissolved except for a few parts per million (ppm). The precipitated calcium carbonate and impurities are suspended in the solution with about 15% to 25% magnesium chloride. The suspension then travels via a duct or path 9 to a filter 10 where the solid in suspension, consisting of calcium carbonate mixed with impurities and some magnesium carbonate, is withdrawn via a duct or path 11.

The remaining, clear magnesium chloride solution flows via a duct or path 12 to a precipitator 13 to which carbon dioxide and ammonia are also added to thus precipitate magnesium carbonate trihydrate (MgCO$_3$.3H$_2$O) in accordance with the known reaction;

$$MgCl_2 + CO_2 + 2NH_3 + 4H_2O \rightarrow MgCO_3 \cdot 3H_2O + 2NH_4Cl.$$

Referring to FIG. 2, the precipitator includes a circuit 13-1 which has an absorption device 13-2, by means of which carbon dioxide and ammonia are introduced into the circuit via lines 14, 15 respectively in approximately stoichiometric ratios. The absorption device 13-2 can comprise a mixing portion in which the two gases are conveyed in co-current with the liquid. The carbon dioxide and ammonia both come from further steps in the process to be described later. During operation, the circuit 13-1 mainly contains ammonium chloride (NH$_4$CL) in aqueous solution, some magnesium chloride, absorbed carbon dioxide, ammonia gas and a few percent of precipitated suspended crystals of magnesium carbonate trihydrate. The proportions of carbon dioxide and ammonia are made such that, relative to the magnesium chloride flowing into the circuit 13-1 through duct 12, the molar proportions are approximately;

$$NH_3 : MgCl_2 = 2:1$$

and $$CO_2 : MgCl_2 = 1:1.$$

Immediately after the absorption of the two gases, the precipitation reaction occurs and magnesium carbonate trihydrate is formed in accordance with the aforementioned equation. These previously precipitated magnesium carbonate trihydrate crystals serve as nuclei for producing larger crystals. This prevents undesirable supersaturation in the circuit 13-1, which may cause spontaneous formation of nuclei, resulting in disadvantageous fine-grained and/or dendritic crystals.

The circuit 13-1 also has a residence container 13-3 where the magnesium carbonate trihydrate crystals (still very small) can grow. The circuit has means (not shown) for maintaining the temperature of the circuit between 25° C. and 45° C. and the pH of from 7.5 to 8.5 with the pressure at atmospheric pressure. The larger crystals form a slurry at the bottom of the residence container 13-3, whereas the rest of the container contents flows back into the circuit 13-1, entraining the mostly small, suspended crystals. The crystal slurry flows continuously via a duct or path 17 to a separator 18 in which the slurry is separated from the entrained solution. The separator 18 can be a filter or centrifuge. The remaining, clear solution flows away via a duct or path 16. Some of the clear solution, however, is recycled via a branch duct 16-1 to the circuit 13-1. The rest of the solution flows off via a branch duct 16-2. The relative quantities of the two flows in the circuit 13-1 and in duct 17 can be adjusted so as to produce the optimum concentration of solids for the process in the circuit.

Referring to FIG. 1, the solid (i.e. magnesium carbonate trihydrate crystals and mother-liquor) produced in the separator 18 flows via a duct or path 19 to a washing device 20 in which the solid is washed in counter-current with a minimum of water, i.e. is freed from the mother-liquor. The soiled water is recycled to the precipitator 13-1 via a line (not shown).

The washed solid, which consists only of pure magnesium carbonate trihydrate crystals and moisture, flows through a drying and decomposition stage 22, e.g. a fluidized-bed furnace, in which the crystals are dried and decomposed at a temperature up to 700° C. In the process, carbon dioxide is liberated and is re-cycled through the duct 15 to the absorption device 13-2 of the precipitator 13. The remaining magnesium oxide flows away through a duct 23. The resulting pure magnesium oxide, owing to the relatively low calcination temperature, has good surface activity. The magnesium oxide can therefore e.g. be formed into briquettes without a binder and subsequently burnt to form high-quality magnesium oxide sinter. Alternatively, the magnesium oxide can be used as an active neutralizing agent or adjuvant for chemical and pharmaceutical purposes.

The various substances formed during the reactions are used as material for preceding reactions, so that no external substances need be added.

First, the residues after leaching, i.e. the solids comprising calcium carbonate, impurities and some magnesium carbonate, flow from the filter 10 via a duct 11 and are washed in a washing stage 24, using a calcium chloride solution obtained in an ammonia recovery stage 29. As a result of washing, any remaining magnesium carbonate produced during leaching with the excess carbon dioxide in the leaching stage 6 is reconverted to magnesium chloride in accordance with the equation:

$$MgCO_3 + CaCl_2 \rightarrow MgCl_2 + CaCO_3$$

The solid is also freed from any adhering magnesium chloride solution and exits via a duct 25. As a result of washing, the magnesium chloride in the adhering solution is replaced by calcium chloride. It is important to ensure that the solid leaving the washing stage 24 via the duct 25 contains substantially no magnesium chloride, not only because the substance will be wasted but also because, in contrast to calcium chloride, the solid will produce corrosive hydrogen chloride during the subsequent heat-treatment.

The washed solid, mainly calcium carbonate, flows via the duct 25 to a decomposition stage 26, e.g. a shelved furnace where the solid is dried and calcined. The temperature in the hottest part of the furnace 26 is up to 900° C. The liberated carbon dioxide is recycled via a duct 7 to the leaching stage 6 while the resulting calcined lime (CaO) flows through a duct 27 to the ammonia recovery stage 28, carrying impurities therewith. In addition, the ammonium chloride solution from the separator 18 flows through the duct 16-2 to the ammonia recovery stage 28 and is decomposed to ammonia and calcium chloride in accordance with the overall formula:

$$CaO + 2NH_4CL \rightarrow CaCl_2 + 2NH_3 + H_2O$$

The calcium chloride exits the recovery stage 28 and is delivered via the duct 30 to the washing stage 24 while the ammonia exits the recovery stage 28 via the duct 14 and is cycled to the precipitator 13.

In reality, the processes in the recovery stage 28 are more complicated. During a first step, dissolved ammonia and carbon dioxide are expelled from the ammonium chloride solution. Next, calcium oxide or hydrated lime Ca(OH)$_2$ is added, thus decomposing the ammonium chloride. Finally, the solution is given further heat-treatment, thus expelling all the ammonia.

The ammonia recovery stage 28 is substantially the same as the ammonia recovery in the Solvay soda process. However, this step in the process has a special additional feature. When calcium oxide is added, practically all the impurities in the starting material (magnesite ore) are deposited in insoluble form and are entrained in insoluble form with calcium oxide. Consequently, the capacity of the recovery stage 28 to separate solids must be specially adapted to the special conditions of the total process. After separation, the impurities leave the recovery stage 28 via a duct 31 and are dumped.

Absorption of carbon dioxide and ammonia in the circuit 13-1 can also be brought about as follows. First, the gases are absorbed with water, preferably waste water from the washing stage 20, in a counter-current column (not shown) and ammonium carbonate solution is produced as an intermediate stage. This solution is then introduced into the circuit 13-1 instead of the two gases. This method has an advantage in that ammonia and carbon dioxide can easily be temporarily stored, but the result is to introduce additional water into the process, which has to be removed by evaporation at another point. Theoretically, the stage can occur at various points, but preferably between the filter 10 and the precipitator 13.

The invention thus provides a method of producing very pure magnesium ore without the need for large amounts of energy. Further, the invention provides a method of obtaining pure magnesium oxide in a process which does not require large amounts of water.

The embodiments of the invention in which an inclusive property or priviledge is claimed are defined as follows:

1. A method of producing magnesium oxide comprising the steps of
    obtaining an ore containing magnesium and being capable of producing magnesium oxide upon calcination;
    calcining the ore to obtain magnesium oxide;
    leaching the obtained magnesium oxide with carbon dioxide and a calcium chloride solution in a leaching stage to obtain a magnesium chloride solution of a concentration of from 15% to 25% and calcium carbonate;
    introducing said magnesium chloride solution into a precipitator and adding continuously carbon dioxide and ammonia to the magnesium chloride solution in the precipitator to precipitate magnesium carbonate trihydrate crystals and to obtain an ammonium chloride solution while maintaining a temperature of from 25° C. to 45° C. and pH from 7.5 to 8.5;
    continuously separating a part of the precipitated magnesium carbonate trihydrate crystals from the precipitation;
    and
    decomposing the magnesium carbonate trihydrate in a first decomposing stage to obtain magnesium oxide and carbon dioxide.

2. A method as set forth in claim 1 which further comprises the step of decomposing the calcium carbonate obtained in the leaching stage in a second decomposing stage to obtain carbon dioxide and calcium oxide.

3. A method as set forth in claim 2 wherein the carbon dioxide obtained in said second decomposing stage is delivered to said leaching stage, the calcium oxide obtained in said second decomposing stage is delivered to said recovery the calcium chloride solution obtained in said recovery stage is delivered to said leaching stage, the ammonia obtained in said recovery stage is delivered to said precipitator and the carbon dioxide obtained in said first decomposing stage is delivered to said precipitator.

4. A method as set forth in claim 3 wherein the calcium chloride solution obtained in said recovery stage washes the calcium carbonate from said leaching stage in a washing stage.

5. A method as set forth in claim 1 which further comprises the step of adding calcium oxide to the ammonium chloride solution in a recovery stage to obtain ammonia and calcium chloride solution.

6. A method as set forth in claim 1 wherein the obtained crystals are washed and subsequently decomposed in the decomposing stage.

7. A method of producing pure magnesium oxide comprising the steps of
    obtaining an ore containing magnesium and being capable of producing magnesium oxide upon calcination;
    calcining the ore to obtain magnesium oxide;
    leaching the obtained magnesium oxide with carbon dioxide and a calcium chloride solution to obtain a magnesium chloride solution having a concentration of from 15% to 25%;
    adding carbon dioxide and ammonia continuously to the magnesium chloride solution in approximately stoichiometric ratios to precipitate magnesium carbonate trihydrate crystals and to obtain an ammonium chloride solution while maintaining a temperature of from 25° C. to 45° C. and a pH of from 7.5 to 8.5;
    continuously separating a part of the precipitated magnesium carbonate trihydrate crystals;
    continuously withdrawing ammonium chloride solution;
    washing and drying the separated crystals; and
    decomposing the magnesium carbonate trihydrate crystals to obtain magnesium oxide.

8. A method as set forth in claim 7 wherein said leaching step produces calcium carbonate, said step of adding carbon dioxide and ammonia to the magnesium chloride solution obtains an ammonium chloride solution during precipitation of the magnesium carbonate trihydrate, and said decomposing step produces carbon dioxide.

9. A method as set forth in claim 8 which further includes the steps of decomposing the calcium carbonate occurring during leaching to obtain carbon dioxide for re-cycling to said leaching step;
    recovering ammonia and calcium chloride solution from the ammonium chloride solution formed during precipitation of the magnesium carbonate trihydrate for re-cycling of the ammonia to the magnesium chloride solution and re-cycling of the calcium chloride solution to said leaching step;
    re-cycling the carbon dioxide obtained in said second step to the magnesium chloride solution; and
    decomposing the calcium carbonate obtained from said leaching step to obtain calcium oxide for addition to the ammonium chloride solution to recover ammonia.

10. A method as set forth in claim 9 wherein the calcium carbonate obtained during leaching is washed with calcium chloride solution obtained from the ammonium chloride solution.

11. A method as set forth in claim 7 wherein said step of leaching includes adding the magnesium oxide to the calcium chloride solution to produce a suspension and adding the carbon dioxide into said suspension at a rate to maintain the pH at least above 5.5 while maintaining the reaction at room temperature.

12. A method as set forth in claim 11 which further includes the step of adjusting the proportion of magnesium oxide in said leaching step to maintain said pH.

13. A method of producing pure magnesium oxide comprising the steps of obtaining an ore containing magnesium and being capable of producing magnesium oxide upon calcination and carbon dioxide;

calcining the ore to obtain magnesium oxide;

leaching the obtained magnesium oxide with carbon dioxide and a calcium chloride solution to obtain a magnesium chloride solution having a concentration of from 15% to 25% and calcium carbonate;

adding carbon dioxide and ammonia continuously to the magnesium chloride solution in approximately stoichiometric ratios to precipitate magnesium carbonate trihydrate crystals and to obtain an ammonium chloride solution while maintaining a temperature of from 25° C. to 45° C. and pH of from 7.5 to 8.5;

continuously separating a part of the precipitated magnesium carbonate trihydrate crystals;

continuously withdrawing the ammonium chloride solution;

washing and drying the separated crystals;

decomposing the magnesium carbonate trihydrate crystals to obtain magnesium oxide;

decomposing the calcium carbonate occurring during said leaching step to obtain carbon dioxide for re-cycling thereto;

recovering ammonia and calcium chloride solution from the ammonium chloride solution formed during precipitation of the magnesium carbonate trihydrate for re-cycling of the ammonia to the magnesium chloride solution and for re-cycling of the calcium chloride solution to said leaching step;

re-cycling the carbon dioxide obtained in said step for decomposing the magnesium carbonate trihydrate to said precipitation step; and decomposing the calcium carbonate obtained from said leaching step to obtain calcium oxide for addition to the ammonium chloride solution in said recovering step to recover ammonia therefrom.

* * * * *

UNITED STATES PATENT AND TRADEMARK OFFICE
CERTIFICATE OF CORRECTION

PATENT NO. : 4,508,690
DATED : April 2, 1985
INVENTOR(S) : Albert Obrist, et al

It is certified that error appears in the above-identified patent and that said Letters Patent is hereby corrected as shown below:

Column 5, line 61 change "claim 1" to --claim 5--

Signed and Sealed this

Fifteenth Day of October 1985

[SEAL]

Attest:

Attesting Officer

DONALD J. QUIGG

Commissioner of Patents and Trademarks—Designate